July 1, 1930.  H. G. LYKKEN  1,768,621
FLUIDIZER
Filed Nov. 25, 1927  2 Sheets-Sheet 1
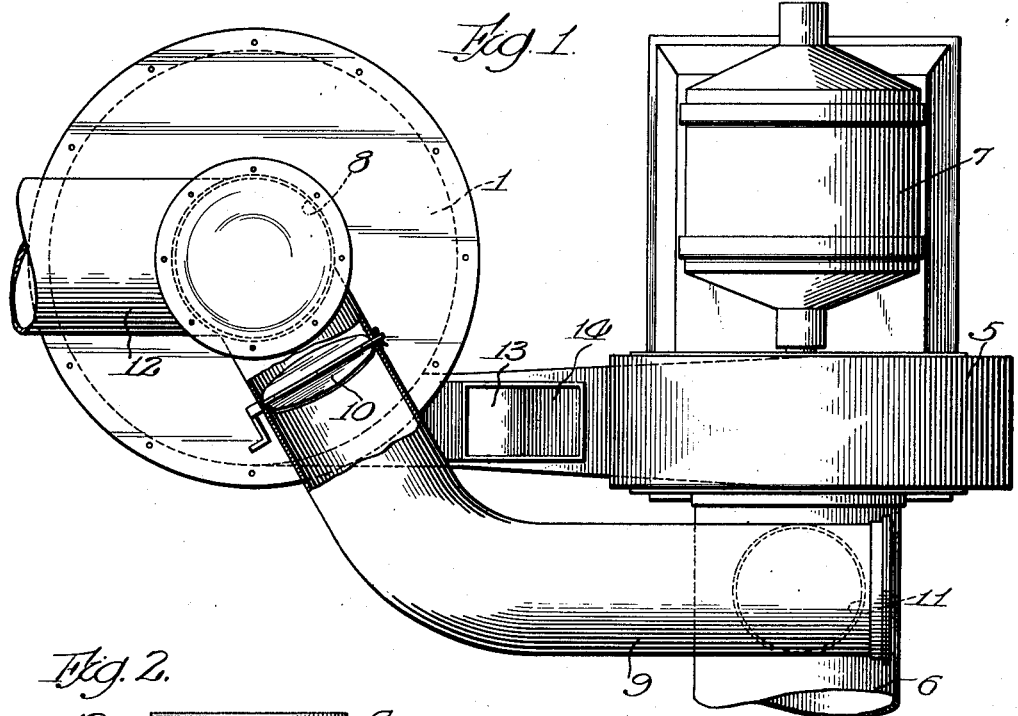
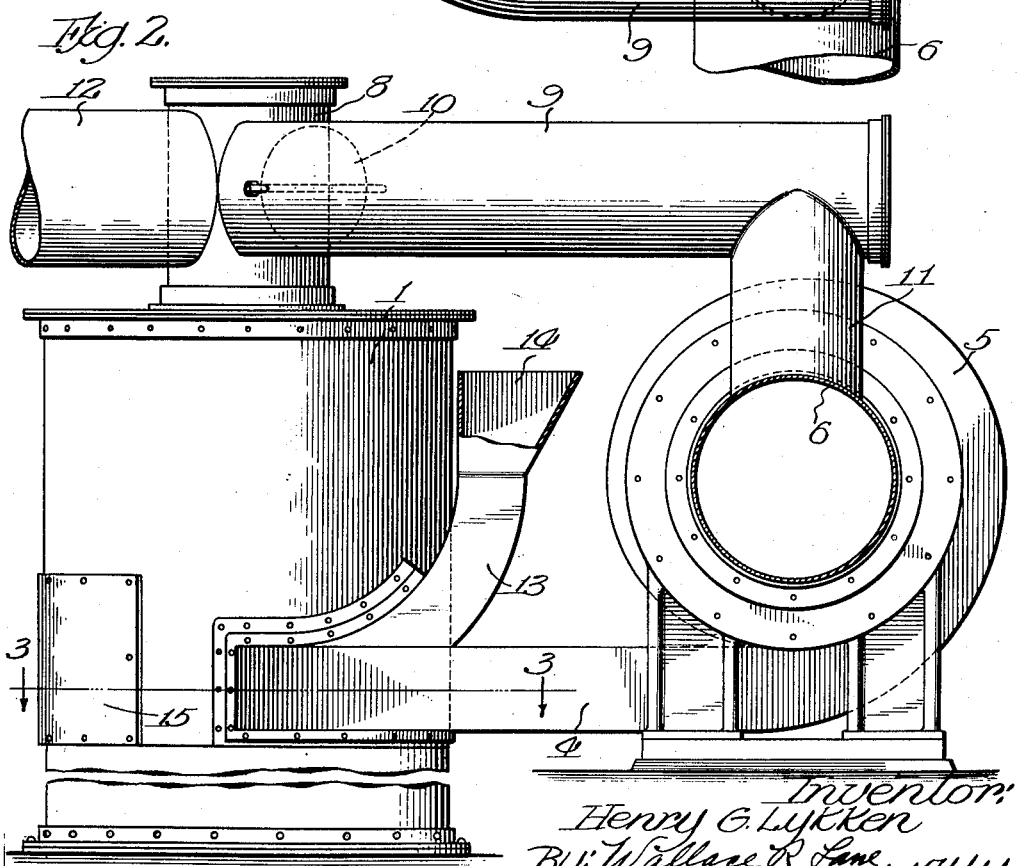
Inventor:
Henry G. Lykken
By: Wallace R. Lane, Atty.

July 1, 1930.  H. G. LYKKEN  1,768,621
FLUIDIZER
Filed Nov. 25, 1927   2 Sheets-Sheet 2
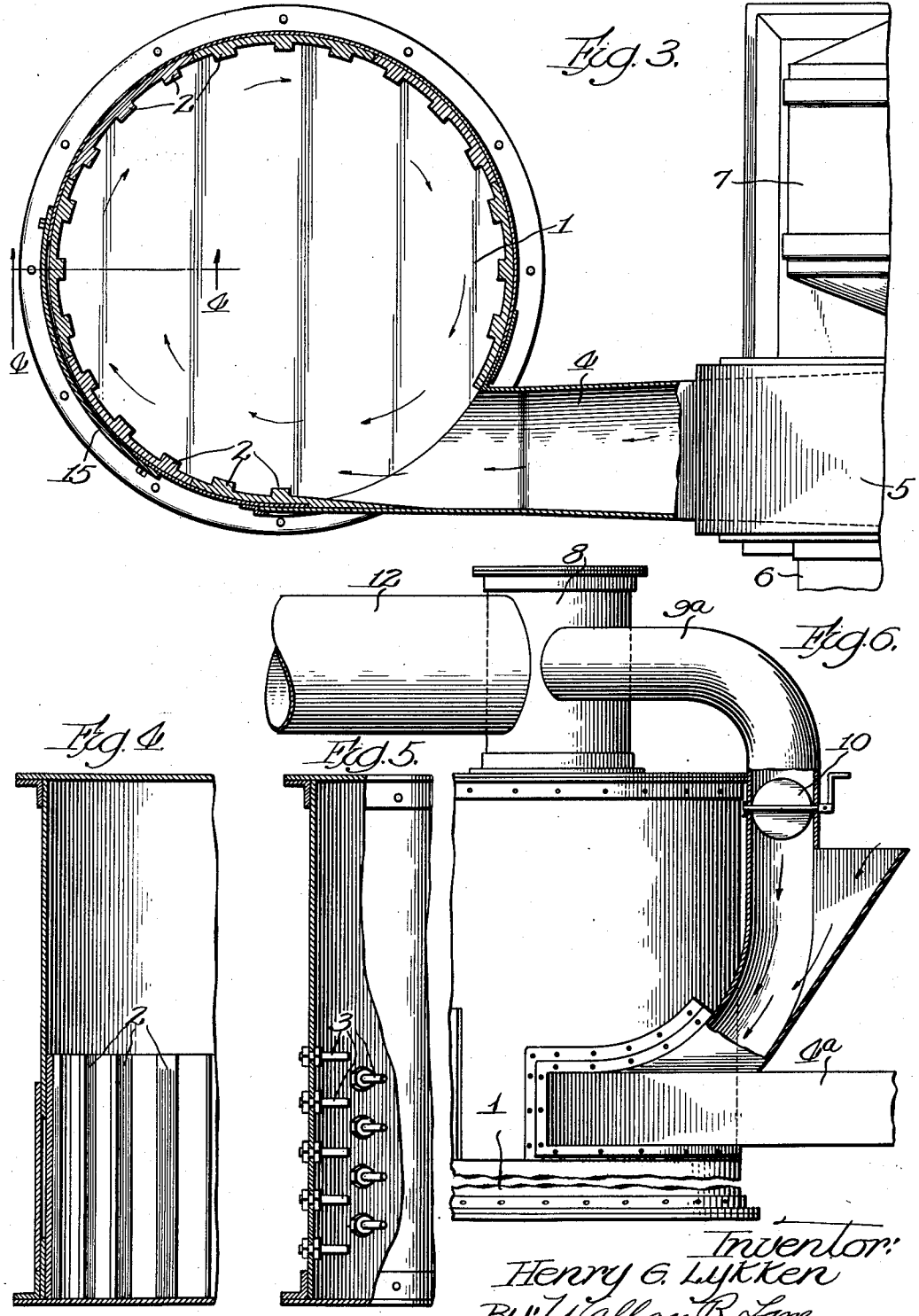

Patented July 1, 1930

1,768,621

UNITED STATES PATENT OFFICE

HENRY G. LYKKEN, OF MINNEAPOLIS, MINNESOTA

FLUIDIZER

Application filed November 25, 1927. Serial No. 235,726.

The present invention relates to fluidizers or devices for reducing material to a finely divided state or fluidal condition.

Among the objects of the invention is to provide a novel means or device for fluidizing or reducing friable material to a finely divided state or fluidal condition by a vorticose action of a fluid, whether gaseous or liquid, by preferably forcing the fluid, as in the form of a stream, at high velocity into a confined or closed space or chamber having a bed of material therein, and causing the fluid to act over the surface of such bed of material and to form a rapid vortex or like movement whereby whirling strata of suspended particles will stress upon each other to reduce particles to a fine condition. In the specific embodiment chosen to illustrate the invention, the fluid used is air and the material reduced is coal, but the use of other fluids and material is comprehended by this invention. The air is projected through an inlet, such as a nozzle, which may be tapered to concentrate the air stream, into a chamber, preferably round or circular, with great force at a high velocity, and also tangentially into the space in the chamber. The projected stream preferably is so made as to pass over or adjacent the bed of the material in the chamber to entrain parts of the material and to whirl the mass of entrained material and air into a cyclonic or tornado-like eddying or whirling or vorticose movement which is violent enough to be destructive of the existing form of the material, thereby causing a reduction of the same to a fine dust or finely divided particles. The vorticose movement gradually rises and the mixture of reduced particles and air pass out through an outlet and then to a point or locus of use, such as a combustion chamber of a furnace or heater or boiler, or to a separating or classifying device for separating the particles into different grades or classes of fines. Means may also be provided in the chamber for causing the return of the coarser or heavier particles to the material bed for further treatment. Also, means may be provided for holding the bed of material against bodily movement, or for retarding any movement thereof. Moreover, means may be provided for the collection of non-reducible materials or elements which may be made to sink through the bed of material into a collecting space or compartment. To aid the control of the character of particles conducted off, a by-pass means for the fluid may be used, for returning and reusing a part of the fluid passing out of the device, such as from the outlet to the inlet. Means may also be provided for supplying material to the bed in the chamber to maintain the same in given quantity, such as by any suitable feeding device.

Other objects, advantages, capabilities and features are comprehended by the invention as will later appear and are inherently possessed thereby.

Referring to the drawings, Fig. 1 is a top plan view with parts broken away, of an embodiment constructed in accordance with the invention;

Fig. 2 is a view in elevation of the same;

Fig. 3 is a view partly in plan and partly in horizontal section taken in a plane represented by line 3—3 shown in Fig. 1 of the drawings;

Fig. 4 is a fragmentary vertical sectional view taken in a plane represented by line 4—4 shown in Fig. 3 of the drawings;

Fig. 5 is a similar view taken in a similar plane of an alternate form; and

Fig. 6 is a view partly in elevation and partly in section of an alternate form of device.

Referring now more in detail to the drawings, the embodiments selected to illustrate the invention are shown as comprising a chamber 1 of any suitable form and having therein replaceable liners such as ribs 2, or pins 3 as shown in Figs. 4 and 5 of the drawings. To a lower part of the chamber 1 and tangentially associated therewith is connected an inlet passage 4 which is preferably tapered as shown, the intake of the passage 4 being connected to a discharge of a fluid forcing device 5 such as a fan or blower, or a pump or the like, such device having an intake 6 for the fluid. The fluid forcing device 5 may be operated by any suitable motive means such as a motor 7 as clearly shown.

To the upper part of the chamber 1 may be connected an outlet device 8 from which may lead a conduit or duct 9 having a suitable valve 10 therein, and leading to a connection 11 preferably connected with intake 6 of the fluid forcing device 5. To the outlet 8 may also be connected a conduit or duct 12 which may lead to a point or locus of use, such as a combustion chamber of a furnace, heater or boiler or the like, or to a separating and classifying device in which the finer particles may be separated from the coarser particles, or from the conducting fluid, or classified into various grades and classes of fineness of the particles as desired. The duct 9 acts as a by-pass for conducting back a part of the fluid passing from the chamber into the inlet 8, and the character of the fines may be regulated and the efficiency of the device may be controlled by a suitable operation of the valve 10 by any suitable means.

Within the chamber 1 may be maintained a bed of material to be acted upon, and the given amount or quantity of this bed may be maintained by a suitable supply means 13, which may have a hopper 14 and with which may be associated any suitable type of feeding mechanism for supplying the additional material into the chamber at a given rate.

In the lower part of a chamber 1 is a space in which may be collected non-reducible elements or material which may sink through the bed of material as it is acted upon by the fluid. A door 15 may be provided for access to the interior of the chamber when it is desired to remove the non-reducible elements.

In the operation of the device a bed of material to be reduced is maintained in the lower part of the chamber 1 and is prevented from bodily movement by the engagement of the liners 2 or 3 or both, and the fluid forcing device is operated to project through the nozzle or inlet 4, a stream of fluid at high velocity so as to project the same into or against the surface of the material tangentially in the chamber 3 so as to cause a rotary vorticose movement of the fluid stream together with particles of entrained material from the bed of material. The mixture will move with an intense and rapid movement in the form of a vortex or the like with tornado-like movement and action whereby the particles will move in strata so that the inner layers will press or stress against adjacent outer layers with sufficient force to cause particles to act upon particles, with a destructive effect of the particles, to reduce them in size and to a fine state or condition. This whirling action will gradually rise in the chamber toward the outlet 8, together with eddy actions, whereby the larger or heavier particles will be caused to move toward the outer walls of the chamber, and then descend along such walls toward the bed of material for retreatment. The finer particles and actuating fluids will pass into the outlet, and then to the duct 12. A part of the mixture may also pass to the by-pass 9 to be resupplied to the fluid forcing device 5. Material may be maintained in the hopper 14, and made through any suitable type of feeding mechanism, to pass through the supply passage 13 into the chamber 1 so as to maintain the amount of material in the bed at a given quantity.

In the form of device shown in Fig. 6, the by-pass 9$^a$, instead of leading back to the blower or pump 5, may lead directly into the nozzle or inlet 4$^a$, which by reason of the tapered form, will draw the fluid from the duct 9$^a$ to be mixed with the fluid from the forcing means 5, and be projected therewith into the chamber 1. This duct may also have a control valve 10$^a$ for the regulation above described in connection with the by-pass 9$^a$.

While I have herein disclosed and upon the drawings shown a few embodiments of the invention, it is to be understood that the latter is not limited thereto, but may comprehend other constructions, arrangements of parts, details and features without departing from the spirit thereof.

Having thus disclosed the invention, I claim:

1. A device for fluidizing materials, comprising a chamber having a body of material therein, means for forcibly projecting a fluid stream into said chamber and over the surface of said material to cause a vorticose action of fluid and material to reduce the material to fine condition, and means for conducting off the reduced material.

2. A device for fluidizing materials, comprising a chamber having a body of material therein, means for forcibly projecting a fluid stream into said chamber and over the surface of said material to cause a vorticose action of fluid and material to reduce the material to fine condition, means for conducting off the reduced material, and means for by-passing a part of the fluid from said conducting of means to said projecting means.

3. A device for fluidizing materials, comprising a round chamber having a body of material therein, means tangentially associated with the interior of said chamber for forcibly projecting a fluid tangentially in said chamber and over the surface of said body of material to cause a vorticose action of the fluid and part of said material, and means for conducting off said fluid and reduced material.

4. A device for fluidizing materials, comprising a round chamber having a body of material therein, means tangentially associated with the interior of said chamber for forcibly projecting a fluid tangentially in said chamber and over the surface of said body of material to cause a vorticose action of the fluid and part of said material, means for conducting off said fluid and reduced material, and a by-pass passage connected to said conducting off means and said projecting means.

5. A device for fluidizing materials, comprising a chamber having a body of material to be reduced therein, means for feeding material into said chamber, means for forcibly projecting a stream of fluid into said chamber and over the surface of said body of material for effecting a vorticose action of the fluid and part of the material to reduce the material to a fine state, and means for conducting off the reduced material.

6. A device for fluidizing materials, comprising a closed chamber having an outlet and an inlet, said inlet being located to project fluid tangentially in said chamber, means for delivering a fluid through said inlet at a high velocity, and a material bed being maintained in the chamber from which the projected fluid reduces material by a vorticose action of the fluid and material, said outlet serving to conduct off the reduced material and fluid.

7. A device for fluidizing materials, comprising a closed chamber having an outlet and an inlet, said inlet being located to project fluid tangentially in said chamber, means for delivering a fluid through said inlet at a high velocity, a material bed being maintained in the chamber from which the projected fluid reduces material by a vorticose action of the fluid and material, said outlet serving to conduct off the reduced material and fluid, and means in said chamber for retarding movement of the bed of material.

8. A device for fluidizing materials, comprising a closed chamber having an outlet and an inlet, said inlet being located to project fluid tangentially in said chamber, means for delivering a fluid through said inlet at a high velocity, a material bed being maintained in the chamber from which the projected fluid reduces material by a vorticose action of the fluid and material, said outlet serving to conduct off the reduced material and fluid, and projections in said chamber for holding the bed of material against bodily movement.

9. A device for fluidizing materials, comprising a chamber, a bed of material being located in said chamber, means for producing a high velocity vorticose movement of a fluid in said chamber and over the surface of said bed of material to reduce said material to a fine state and means for conveying away reduced material and fluid.

10. A device for fluidizing materials, comprising a chamber, a bed of material being located in said chamber, means for producing a high velocity vorticose movement of a fluid in said chamber and over the surface of said bed of material to reduce said material to a fine state, means in the chamber and engaging the bed of material for normally holding the same against bodily movement, and means for conveying away reduced material and fluid.

11. A device for fluidizing materials, comprizing a chamber having side walls, replaceable liners on said walls, a bed of material in said chamber and held from bodily movement by said liners, means for projecting a stream of fluid at a high velocity into said chamber and over the surface of said material to produce a vorticose action of fluid and material to reduce the latter to a fine state, and means for conducting off reduced material and fluid.

12. A device for fluidizing materials, comprising a chamber having side walls, replaceable liners on said walls, a bed of material in said chamber and held from bodily movement by said liners, an inlet passage tangentially associated with said chamber for the projecting of a fluid in said chamber tangentially to effect a vortex action of the fluid and part of the material from said bed of material, means for forcing a fluid at high velocity through said inlet, and means for conducting off reduced material and fluid.

13. A device for fluidizing materials, comprising a chamber, an outlet therefor, a tapered inlet therefor, and means for forcing a fluid at high velocity through said tapered inlet to cause a vorticose action in said chamber for reducing material therein to a fine state.

14. A device for fluidizing materials, comprising a chamber having a body of material therein, means for forcibly projecting a fluid stream into said chamber and over the surface of said material to cause a vorticose action of fluid and material to reduce the material to fine condition, the lower part of the chamber having a space for the collection of non-reducible material adapted to sink from said bed of material, and means for conducting off the reduced material.

In witness whereof, I hereunto subscribe my name to this specification.

HENRY G. LYKKEN.